United States Patent [19]

Kishimoto et al.

[11] Patent Number: 5,382,415
[45] Date of Patent: Jan. 17, 1995

[54] AIR BAG INFLATION GAS GENERATOR

[75] Inventors: Junichi Kishimoto; Takashi Minamizawa, both of Fukushima, Japan

[73] Assignee: Nippon Koki Co., Ltd., Tokyo, Japan

[21] Appl. No.: 127,757

[22] Filed: Sep. 27, 1993

[30] Foreign Application Priority Data

Jun. 22, 1993 [JP] Japan .................. 5-150390

[51] Int. Cl.⁶ .................................. B01J 7/00
[52] U.S. Cl. .................... 422/305; 280/736; 280/741; 422/166
[58] Field of Search .............. 422/165–167, 422/305; 280/736–742

[56] References Cited

U.S. PATENT DOCUMENTS

| | | | |
|---|---|---|---|
| 4,200,615 | 4/1980 | Hamilton et al. | 280/736 |
| 4,394,033 | 7/1983 | Goetz et al. | 280/742 |
| 4,950,458 | 8/1990 | Cunningham | 422/166 |
| 5,058,921 | 10/1991 | Cuevas | 280/736 |
| 5,109,772 | 5/1992 | Cunningham et al. | 422/166 |
| 5,255,938 | 10/1993 | Bredi et al. | 280/741 |

FOREIGN PATENT DOCUMENTS 5138005 6/1993 Japan .

Primary Examiner—W. Gary Jones
Assistant Examiner—Laura E. Collins
Attorney, Agent, or Firm—Kalish & Gilster

[57] ABSTRACT

This invention relates to an air bag inflation gas generator comprising an inner cylindrical member with gas flow openings formed in the outer periphery being inserted into a longitudinal bottom-closed outer cylindrical member with gas outlets formed in the outer periphery with a filter disposed therebetween and gas generating agents being accommodated in the inner cylindrical member, wherein mating sections are disposed at the open end of the inner cylindrical member so as to engage with other mating sections formed at the bottom of the outer cylindrical member, so that the position of the gas flow openings formed in the inner cylindrical member and the position of the gas outlets formed in the outer cylindrical member can be easily and surely set in a predetermined positional relation.

5 Claims, 6 Drawing Sheets

AIR BAG INFLATION GAS GENERATOR

BACKGROUND OF THE INVENTION

1. Field of the Invention

This invention relates to an air bag inflation gas generator to feed combustion gas for inflation of air bags such as air bags for absorbing collision shocks, life jackets, rafts, and escape chutes.

2. Description of the Prior Art

A prior shock absorber to protect a passenger car driver from shocks at collision accidents comprises an air bag and a gas generator to inflate the air bag with gas. At a collision accident of a passenger car, explosives or other gas generating agents having a similar composition thereto, which are charged in the gas generator, are ignited and burnt to produce gas. The air bag is instantaneously inflated by the resultant gas for protecting the driver against any collision shocks, thereby avoiding possible serious injury of the driver.

FIG. 9 shows the air bag inflation gas generator disclosed in Japanese Patent Application Laid-open Print No. 138005/1993. This air bag inflation gas generator comprises a longitudinal outer cylindrical member 13 having a plurality of gas outlets 11 formed in the outer periphery, an inner cylindrical member 17 inserted in the outer cylindrical member 13 and having gas flow openings 15 formed in the outer periphery, a final filter 19 disposed between the outer cylindrical member 13 and the inner cylindrical member 17, a plurality of gas generating agents 23 with a through hole 21 formed at the center accommodated in the stacked state in the axial direction of the inner cylindrical member 17, and an igniter 25 and an ignition agent 27 disposed at one end of the inner cylindrical member 17, wherein the gas generating agents 23 and the ignition agent 27 are accommodated in a gas generating agent pack 29.

With the above air bag inflation gas generator, volume of combustion gas from the gas generating agents 23 can be steeply increased and a large volume of combustion gas can be surely purified.

But, in the above conventional air bag inflation gas generator, since the end of the inner cylindrical member 17 is merely inserted into a hole 13b formed at a bottom 13a of the outer cylindrical member 13, it is difficult to set easily and surely the position of the gas flow openings 15 formed keeping certain positional relation in the inner cylindrical member 17 and the position of the gas outlets 11 formed keeping certain positional relation in the outer cylindrical member 13 in the predetermined positional relation. And, there is a problem that it is difficult to let the combustion gas from the gas generating agents 23 which are burnt inside the inner cylindrical member 17 out from the gas outlets 11 through an optimum route.

More specifically, the combustion gas from the gas generating agents 23 which are burnt inside the inner cylindrical member 17 is flown into the final filter 19 through the gas flow openings 15 of the inner cylindrical member 17, purified in the final filter 19 and flown into an air bag through the gas outlets 11 of the outer cylindrical member 13. But, when the gas flow openings 15 and the gas outlets 11 are not in the predetermined positional relation, the flow-in position of the combustion gas into the final filter 19 and the flow-out position from the final filter 19 are deviated from the set position, and the purifying capacity of the final filter 19 is degraded.

SUMMARY OF THE INVENTION

This invention has remedied the above problems and aims to provide an air bag inflation gas generator wherein the position of gas flow openings formed in an inner cylindrical member and the position of gas outlets formed in an outer cylindrical member can be easily and surely set in a predetermined positional relation.

The air bag inflation gas generator of this invention has an inner cylindrical member with gas flow openings formed in its outer periphery inserted into a longitudinal bottom-closed outer cylindrical member with gas outlets formed in its outer periphery with a filter disposed therebetween, and has gas generating agents accommodated in the inner cylindrical member. And, mating sections which engage with other mating sections formed at the bottom of the outer cylindrical member are disposed at the open end of the inner cylindrical member.

In the air bag inflation gas generator of this invention, when the inner cylindrical member is inserted through the open end of the outer cylindrical member, the mating sections which are formed at the open end of the inner cylindrical member are engaged with the mating sections formed at the bottom of the outer cylindrical member.

In the air bag inflation gas generator of this invention, when the inner cylindrical member is inserted through the open end of the outer cylindrical member and the mating sections which are formed at the open end of the inner cylindrical member are engaged with the mating sections formed at the bottom of the outer cylindrical member, the positional relation between the outer cylindrical member and the inner cylindrical member is restricted, so that the position of the gas flow openings formed in the inner cylindrical member and the position of the gas outlets formed in the outer cylindrical member can be easily and surely set in a predetermined positional relation.

DESCRIPTION OF THE PREFERRED EMBODIMENT OF THE INVENTION

This invention will be described in detail with reference to the attached drawings.

Figure 1:
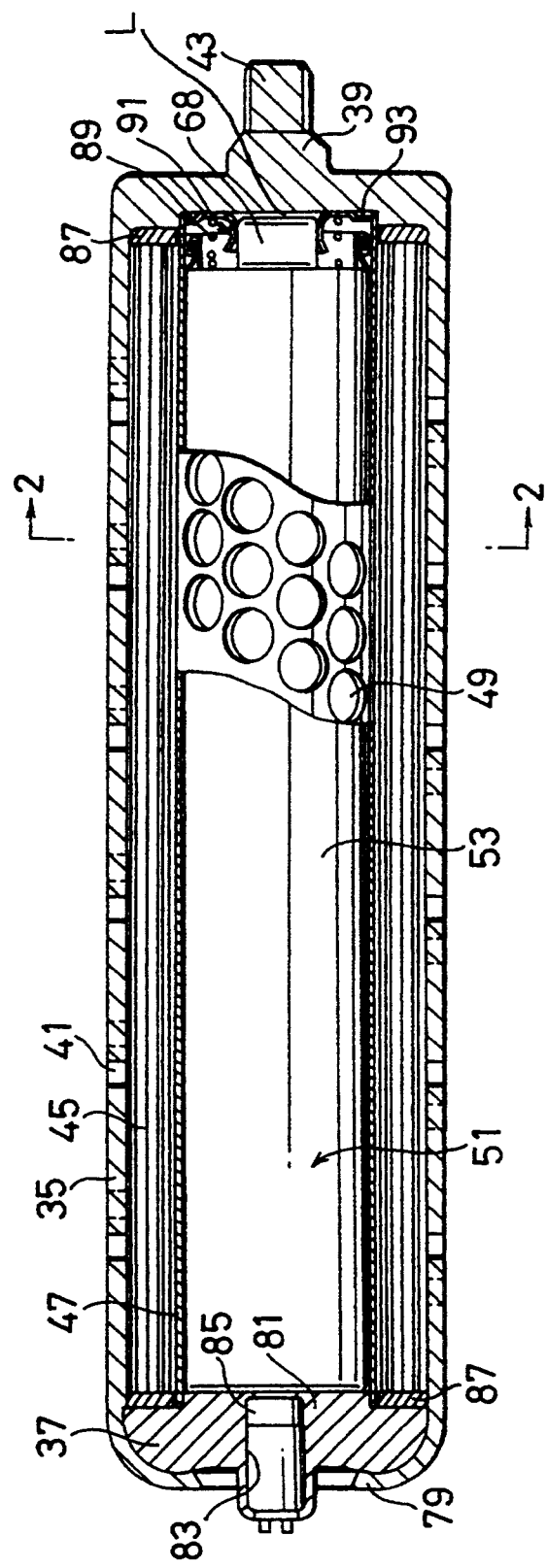
FIG. 1 is a longitudinal sectional view showing one embodiment of an air bag inflation gas generator of this invention.
Figure 2:
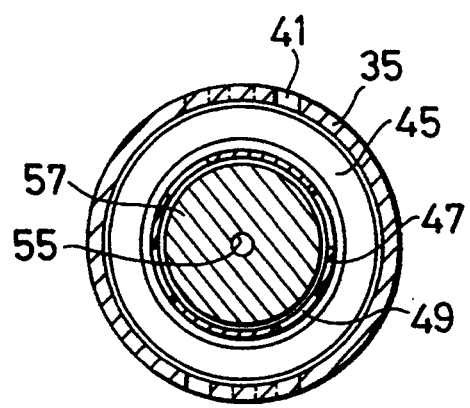
FIG. 2 is a transverse sectional view taken along the line 2—2 of FIG. 1.

FIG. 1 and FIG. 2 show one embodiment of the air bag inflation gas generator of this invention. In the drawings, the reference numeral 35 represents a longitudinal outer cylindrical member whose both ends are tightly closed by end plate parts 37. 39.

The outer cylindrical member 35 has a plurality of gas flow openings 41 formed in its outer periphery.

And, the end plate part 39 is integrally formed with a part 43 to be mounted on a vehicle.

The outer cylindrical member 35 has a cylindrical final filter 45 disposed therein.

This final filter 45 is formed by winding, for example, fine-mesh woven metal wire, close-woven metal wire, etc. in layers. This filter has the functions that the combustion gas is cooled so that the air bag is not damaged, the combustion residue contained in the combustion gas is removed, and harmless nitrogen gas only is supplied into the air bag.

Inside the final filter 45 is inserted an inner cylindrical member 47.

The inner cylindrical member 47 has many gas flow openings 49 formed in the entire length of the outer periphery thereof.

The inner cylindrical member 47 accommodates a gas generating agent pack 51.

Figure 3:
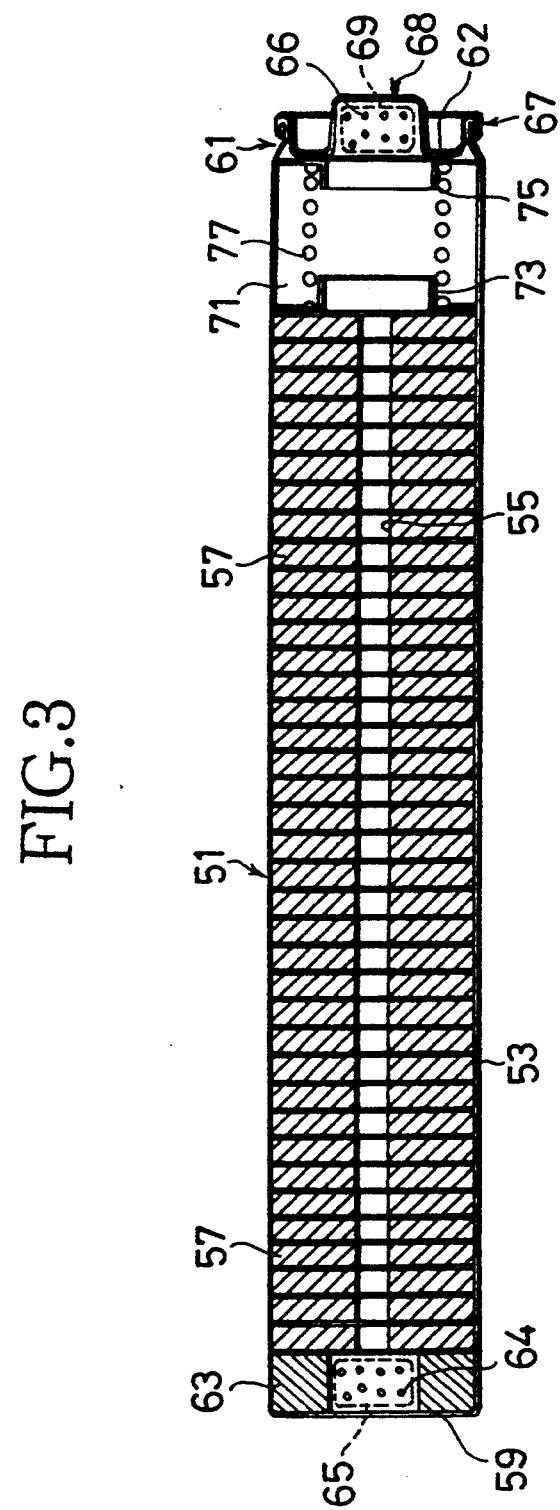
FIG. 3 is a sectional view showing the gas generating agent pack of FIG. 1.

The gas generating agent pack 51 has a bottom-closed longitudinal cylindrical pack 53 which is made of aluminum as shown in FIG. 3.

Within the cylindrical pack 53, many gas generating agents 57 having a through hole 55 formed in their center are accommodated in the stacked state in the axial direction.

One end of the cylindrical pack 73 is sealed by an end face 59, and the other end is sealed by another end face 62 made of, for example, an aluminum cap 61.

At one end of the cylindrical pack 53, a cylindrical spacer 63 is disposed.

This spacer 63 is formed of, for example, aluminum and an ignition agent 64 which includes an auto-ignition powder igniting at a low temperature of, for example, 180° C. is disposed at its center.

The ignition agent 64 is accommodated in an ignition agent pack 65.

On the other hand, the cap 61 disposed on the other end of the cylindrical pack 53 is tightly wound around its outer periphery by the cylindrical pack 53 to form a cylindrical fasten-folded section 67.

And, at the center of the cap 61 is formed a projection 68 to accommodate an ignition agent 66.

The ignition agent 66 contains powder for auto-ignition which ignites at a low temperature of 180° C. and is accommodated in an ignition agent pack 69.

A space 71 is formed on the side of the cap 61 in the cylindrical pack 53. In the space 71, a holder 73 which is in contact with one of the gas generating agents 57 and another holder 75 which is in contact with the cap 61 are accommodated. Both ends of a coil spring 77 are supported by the holders 75.

As shown in FIG. 1, the end plate 37 which seals one end of the outer cylindrical member 35 is made of an end cap and caulked for fixing against the cylindrical pack 53 by an open end 79 of the outer cylindrical member 35.

The above fixing by caulking is made by a step that with a fitting section 81 of the end plate part 37 mated with the open end of the inner cylindrical member 47, the open end 79 of the outer cylindrical member 35 is bent toward the end plate 37 by a press under a certain pressure to effect plastic deformation A through hole 83 is formed at the center of the end plate 37, and an igniter 85 is inserted into the through hole 83 and fixed to the end plate 37 by caulking.

A packing 87 made of, for example, inflammable silicone rubber, is disposed between one end of the final filter 45 and the end plate 37 and between the other end of the final filter 45 and the end plate 39.

In this embodiment, an energizing member 89 made of, for example, a coil spring is disposed between the cap 61 forming the end face 62 of the gas generating agent pack 71 and the end plate 39 of the outer cylindrical member 35.

And, the leading end of the projection 68 is disposed with a certain gap L provided against the end plate 39.

With this projection 68, a heat transmission member 91 which is pressed by the energizing member 89 against the end plate 39 is mated by a mating load smaller than the energizing load of the energizing member 89.

Figure 4:
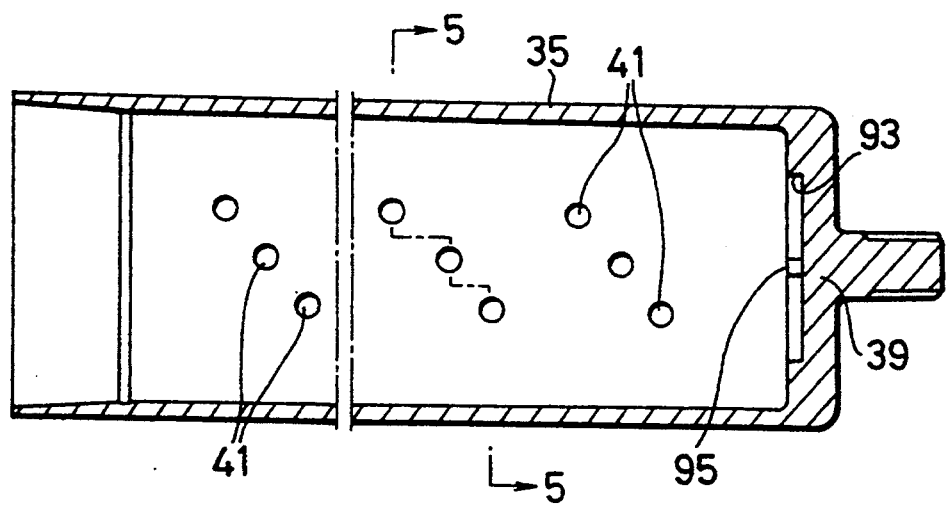
FIG. 4 is a sectional view showing the outer cylindrical member of FIG. 1.
Figure 5:
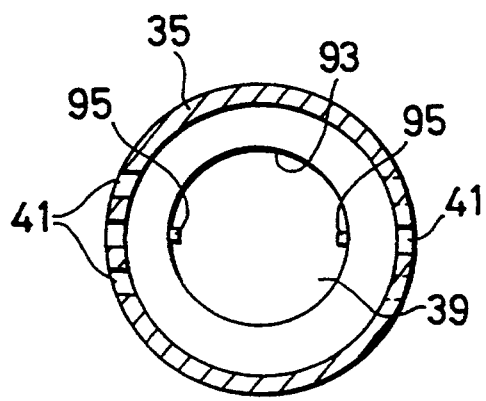
FIG. 5 is a sectional view taken on the line 5—5 of FIG. 4.

In this embodiment, a recess 93 in which the end of the inner cylindrical member 47 is inserted is formed in the end plate 39 of the outer cylindrical member 35 as shown in FIG. 4 and FIG. 5.

On the wall of the recess 93, a pair of rectangular convex parts 95 are integrally formed opposite to each other at an angle of 180 degrees.

Figure 6:
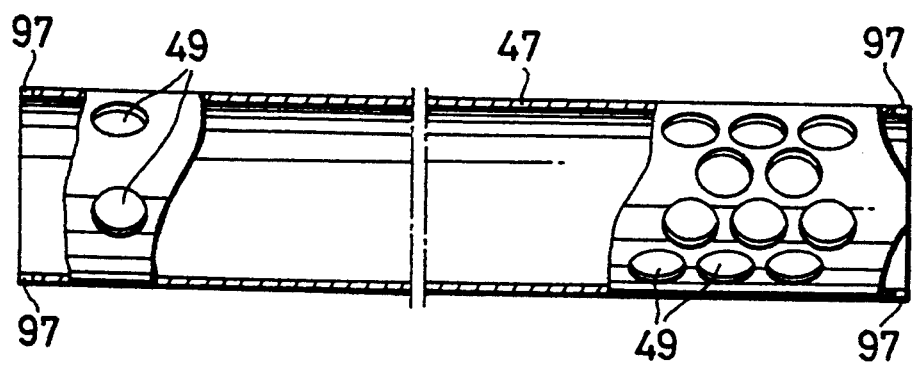
FIG. 6 is a sectional view showing the inner cylindrical member of FIG. 1.
Figure 7:
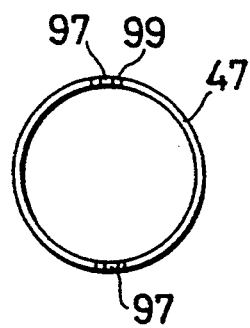
FIG. 7 is a front view of FIG. 6.

On the other hand, both open ends of the inner cylindrical member 47 have a pair of rectangular concave parts 97 formed opposite to each other at an angle of 180 degrees as shown in FIG. 6 and FIG. 7.

Figure 8:
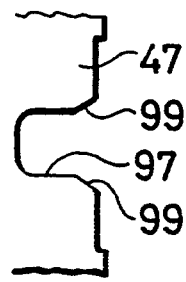
FIG. 8 is an enlarged view showing the details of the concave part of FIG. 6.
Figure 9:
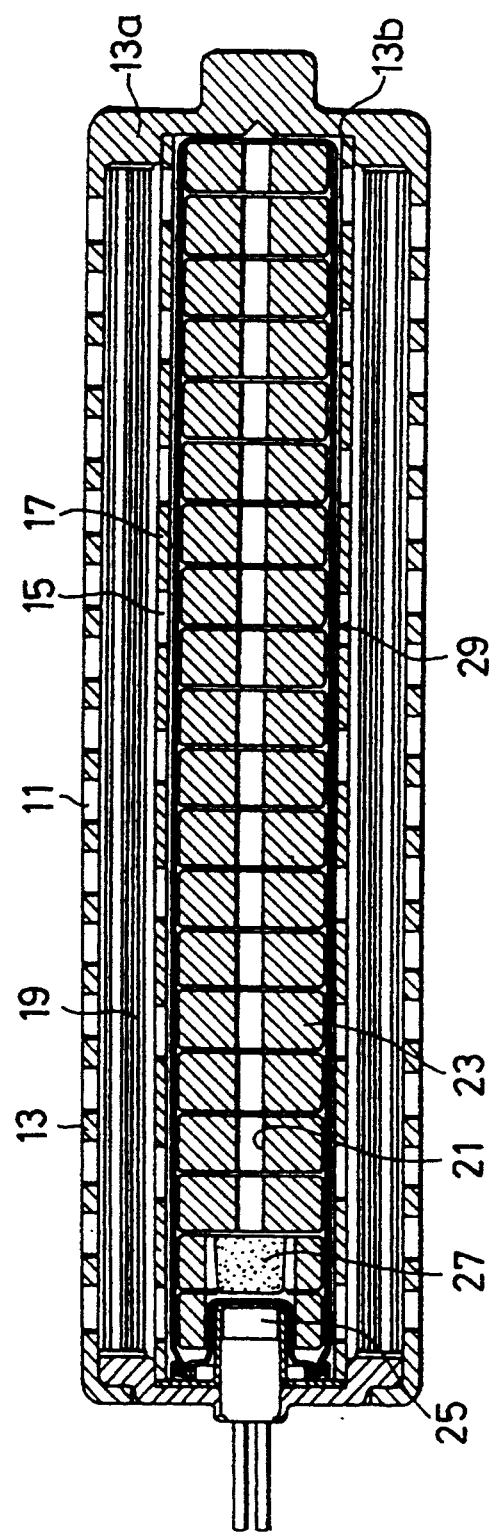
FIG. 9 is a longitudinal sectional view showing the air bag inflation gas generator disclosed in Japanese Patent Application Laid-open Print No. 138005/1993.

At the entrance to the concave part 97, a chamfer 99 is formed as shown in FIG. 8, so that the convex parts 95 can be easily inserted into the concave parts 97.

In the aforementioned air bag inflation gas generator, the ignition agent 64 burns when electricity is sent to the igniter 85, which in turn burns the gas generating agents 57, the cylindrical pack 53 of the gas generating agent pack 51 is broken at the gas flow openings 49 of the inner cylindrical member 47, combustion gas flows into the final filter 45 through the gas flow openings 49 of the inner cylindrical member 47 and purified by the final filter 45, then it is flown into the air bag through the gas outlets 41 of the outer cylindrical member 35.

And, in the above embodiment, when electricity is sent to the igniter 85 which is disposed at one end of the outer cylindrical member 35, the ignition agent 64 disposed at one end burns first and the gas generating agent 57 adjacent to the igniter 85 starts burning and, at the same timer the ignition agent 66 disposed at the other end burns, and the gas generating agent 57 next to it burns.

In the air bag inflation gas generator configured as described above, since the concave parts 97 which are engaged with the convex parts 95 formed on the end plate 39 of the outer cylindrical member 35 are formed at the open end of the inner cylindrical member 47, the position of the gas flow openings 49 formed in the inner cylindrical member 47 and the position of the gas outlets 41 formed in the outer cylindrical member 35 can be easily and surely set in a predetermined positional relation.

More specifically, in the aforementioned air bag inflation gas generator, when the inner cylindrical member 47 is inserted through the open end of the outer cylindrical member 35 and the concave parts 97 formed at the open end of the inner cylindrical member 47 are engaged with the convex parts 95 formed at the end plate 39 of the outer cylindrical member 35, the positional relation between the outer cylindrical member 35 and the inner cylindrical member 47 is defined, so that the position of the gas flow openings 49 formed in the inner cylindrical member 47 and the position of the gas outlets 41 formed in the outer cylindrical member 35 can be easily and surely set in a predetermined positional relation.

And, in this embodiment, since the concave parts 97 and the convex parts 95 are disposed opposite to each other at an angle of 180 degrees on the inner cylindrical member 47 and the outer cylindrical member 35, respectively, and the gas flow openings 49 and the gas outlets 41 are symmetrically formed in the both members, it is possible to engage the concave parts 97 with the convex parts 95 by turning the inner cylindrical member 47 for at least 180 degrees and thus assembling property can be improved.

Further, in this embodiment, since the concave parts 97 are formed at both ends of the inner cylindrical member 47, the inner cylindrical member 47 can be inserted from either end thereof into the outer cylindrical member 35, improving assembling property.

In the aforementioned embodiment, the concave parts 97 are formed in the inner cylindrical member 47 and the convex parts 95 are formed on the outer cylindrical member 35, but this invention is not limited to the above embodiment. It is needless to say that the convex parts 95 can be formed on the inner cylindrical member 47 and the concave parts 97 can be formed in the outer cylindrical member 35.

What is claimed is:

1. An air bag inflation gas generator comprising:
    a longitudinal outer cylindrical member having an outer periphery with gas outlets formed therein and a bottom end;
    an inner cylindrical member having an outer periphery with gas outlets formed therein and at least one open end;
    wherein the inner cylindrical member is within the outer cylindrical member and said at least one open end of the inner cylindrical member is at the bottom end of the outer cylindrical member;
    a filter between the inner cylindrical member and the outer cylindrical member;
    gas generating agents within the inner cylindrical member;
    mating sections at said at least one open end of the inner cylindrical member and mating sections at the bottom end of the outer cylindrical member; and
    wherein the mating sections of the inner cylindrical member and the mating sections of the outer cylindrical members interlock to maintain a predetermined positional relation between the outer cylindrical member and the inner cylindrical member preventing rotation therebetween, so that the predetermined positional relation aligns the gas outlets of the inner cylindrical member and the gas outlets of the outer cylindrical member providing an optimal route for combustion gas from the gas generating agents out of the inner and outer cylindrical members.

2. An air bag inflation gas generator according to claim 1 wherein the mating sections are rectangular convex or concave parts.

3. An air bag inflation gas generator according to claim 2, wherein the inner and outer cylindrical members are provided with the convex and concave parts opposite to each other at an angle of 180 degrees.

4. The air bag inflation gas generator according to claim 1, wherein the inner cylindrical member further comprises a second open end having mating sections.

5. The air bag inflation gas generator comprising:
    a longitudinal outer cylindrical member having an outer periphery with gas outlets formed therein and a bottom end;
    an inner cylindrical member having an outer periphery with gas outlets formed therein and a first open end and a second open end;
    wherein the inner cylindrical member is within the outer cylindrical member and one of said open ends of the inner cylindrical member is at the bottom end of the outer cylindrical member;
    a filter between the inner cylindrical member and the outer cylindrical member;
    gas generating agents within the inner cylindrical member;
    mating sections at the first open end and the second open end of the inner cylindrical member and mating sections at the bottom end of the outer cylindrical member wherein the mating sections of the outer cylindrical member comprise a pair of rectangular convex parts and the mating sections of the inner cylindrical member comprise a pair of rectangular concave parts having an entrance,
    the entrance to the concave parts including a chamfer to allow the convex parts to easily engage with the concave parts; and
    wherein the rectangular convex and concave mating sections are opposite each other at an angle of 180° and interlock to maintain a predetermined positional relation between the outer cylindrical member and the inner cylindrical member precluding rotation therebetween, wherein the predetermined positional relation aligns the gas flow openings of the inner cylindrical member and the gas outlets of the outer cylindrical member providing an optimal route for combustion gas from the gas generating agents out of the inner and outer cylindrical members.

* * * * *

UNITED STATES PATENT AND TRADEMARK OFFICE
CERTIFICATE OF CORRECTION

PATENT NO. : 5,382,415

DATED : Jan. 17, 1995

INVENTOR(S) : Junichi Kishimoto and Takashi Minamizawa

It is certified that error appears in the above-identified patent and that said Letters Patent is hereby corrected as shown below:

Col. 6, line 18, delete "The" and insert therefor -- An -- .

Col. 6, line 51, delete "flow openings" and insert therefor -- outlets -- .

Signed and Sealed this

Eighteenth Day of April, 1995

*Attest:*

BRUCE LEHMAN

*Attesting Officer*  *Commissioner of Patents and Trademarks*